UNITED STATES PATENT OFFICE.

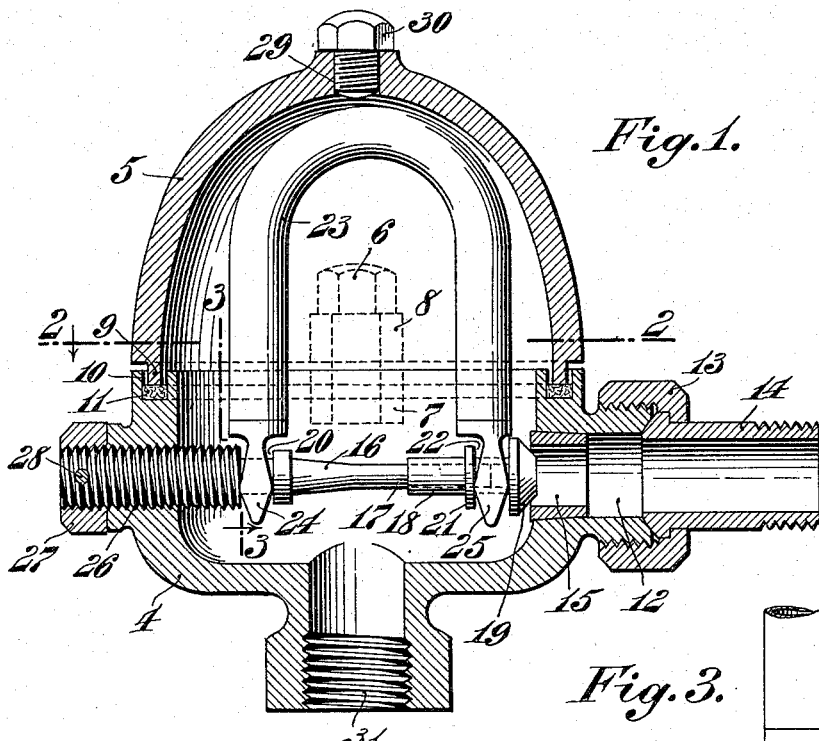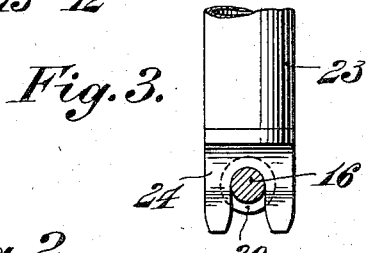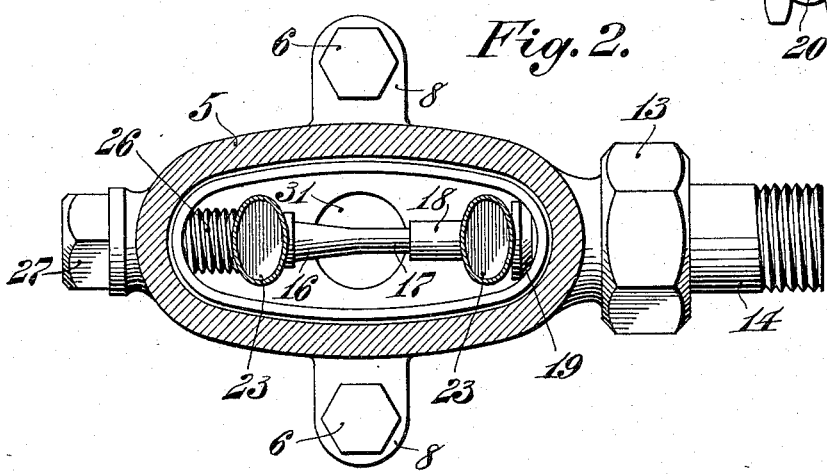

EUGENE S. CALDWELL, OF PHILADELPHIA, PENNSYLVANIA.

THERMOSTATIC VALVE.

1,149,182.

Specification of Letters Patent.

Patented Aug. 10, 1915.

Application filed September 25, 1911. Serial No. 651,273.

*To all whom it may concern:*

Be it known that I, EUGENE S. CALDWELL, a citizen of the United States, residing at Philadelphia, in the county of Philadelphia and State of Pennsylvania, have invented certain new and useful Improvements in Thermostatic Valves, of which the following is a specification.

My invention relates to thermostatic valves and it has particular relation to a device adapted to automatically pass the air and water of condensation from steam radiators or other steam heated appliances.

The principal object of my invention is to provide an improved form of device for automatically permitting the air and water of condensation to drain from steam heated appliances, but which will prevent the passage of live steam from the apparatus, the operation being effected by the high temperature of the steam acting on a thermostatic tube.

A further object of my invention is to provide a device which may be readily opened and dismantled for the purpose of examination or repair, and which is provided with means supporting the valve and associated parts in such manner as to insure the proper readjustment of the valve in the event of the same being dismantled for any purpose.

My invention also contemplates means for detecting improper escape of steam through the apparatus and further contemplates certain improved details of construction as will later appear.

The nature and characteristic features of my invention will be more readily understood from the following description taken in connection with the accompanying drawings forming part hereof, in which—

Figure 1 is a vertical central longitudinal section of a thermostatic valve embodying the main features of my present invention, certain of the interior parts being shown in elevation; Fig. 2 is a horizontal section thereof taken approximately on the line 2—2 of Fig. 2; and Fig. 3 is a detail of the lower end of one of the arms of the thermostatic tube, and certain associated parts, this view being taken approximately on the line 3—3 of Fig. 1.

Referring to the drawings, in the particular embodiment of my invention there shown, 4 is the casing or housing having a cover or cap 5 suitably secured thereto by means of the bolts 6 which engage ears 7 and 8 carried respectively by the housing 4 and its cover 5. The lower edge of the cover 5 has a lip 9 which extends into a complemental groove 10 in the housing 4, which groove also contains a suitable gasket 11 to form an effective seal against the passage of liquids or vapors. The housing 4 is provided with an inlet 12 threaded on its exterior and which is engaged by a suitable union nut 13 and nipple 14 for securing the device in communication with the radiator or other steam heated appliance in connection with which it is adapted to be used. Mounted in the interior of the inlet 12 is a bushing 15, tapered on its exterior and its inner interior edge serving as a valve seat. Mounted within the housing 4, in alinement with the inlet 12, is a stud or guide stem 16 which is in threaded engagement with the housing 4 forming a means of support for the valve in a manner to be presently explained. The inner end of the stud or guide stem 16 extends in proximity to the inlet 12 and is reduced in diameter as at 17 to form a guide upon which the hollow stem 18 of the valve 19 is slidably mounted, the arrangement being such as to support the valve 19 adjacent its seat yet permitting the same to move freely under the thermostatic control hereinafter described. The stud 16 is grooved as at 20, and the valve stem 18 is provided with a collar 21 so as to form a similar groove 22, the other wall of said groove being provided by the rear face of the valve 19.

23 is an inverted U-shaped thermostatic tube which may be of the well known construction of such tubes being flat or elliptical in cross section and containing a quantity of fluid which will vaporize when a predetermined temperature is reached, so that the pressure caused by the vaporization of the contained fluid will set up a tendency of the tube to straighten itself and thereby cause the distance between the two arms thereof to be appreciably increased. Each arm of the thermostatic tube 23 carries at its lower end a bifurcated engaging member 24 and 25 which members 24 and 25 extend into the channels or grooves 20 and 22 respectively on the stud 16 and valve stem 18. The engaging members 24 and 25 each have their lower ends formed into a blunt point from which the front and rear faces extend upwardly in diverging planes to bearing points at the place of greatest width of the engaging members and which bearing points engage the side faces of the grooves or channels 20 and 22 in a plane below the axis of the stud and valve, this arrangement being provided so that there will be no tendency of the bifurcated members 24 and 25 to ride upwardly and disengage themselves from their respective grooves or channels 20 and 22. It will be seen that the thermostatic tube 23 may be readily inserted and removed when desired on account of the manner in which it engages the stud 16 and valve 18 as above set forth.

The outer end of the stud or guide stem 16 is provided with a head or nut 27 which may if desired be made integral with the stud 16 but which for convenience of manufacture is preferably made as a threaded nut mounted on an extended portion of the threaded part 26 of the stud 16 and which is fixedly secured thereon by means of a driven pin 28. The purpose of the foregoing arrangement is to insure the maintenance of the adjustment of the valve 19, as in the event of the temporary removal of the same for the purpose of repair or cleaning, the stud 16 may always be returned to its proper position without any particular skill being required on the part of the manipulator. At the upper end of the cover or lid 5 of the housing 4 there is a threaded aperture 29 which is normally closed by a plug or bolt 30, this arrangement being provided so that any improper passage of steam past the valve 19 may be readily ascertained by the removal of the bolt 30 and if any steam be passing the valve 19 it will be at once indicated at the aperture 29. It will of course be understood that the air and water which passes the valve 19 will pass on through the system through the outlet 31.

Having thus described the nature and characteristic features of my invention what I claim as new and desire to secure by Letters Patent is:—

In a device of the character described a housing, an inlet, a stud supported in said housing in alinement with said inlet, a valve slidably mounted on and supported by said stud and adapted to close the inlet, and an inverted U shaped thermostatic tube having bifurcated engaging members at the end of each arm, the stud and the valve each having a groove for the reception of said bifurcated engaging members, and said engaging members having enlarged bearing portions engaging the side faces of the grooves in the stud and valve only at points below the axis of said stud and valve.

In testimony whereof, I have hereunto signed my name in the presence of two witnesses.

EUGENE S. CALDWELL.

Witnesses:
W. T. HAINES,
WILLIAM S. ATCHISON.

Copies of this patent may be obtained for five cents each, by addressing the "Commissioner of Patents, Washington, D. C."